United States Patent
Lannes

[19]

[11] Patent Number: 6,142,216
[45] Date of Patent: *Nov. 7, 2000

[54] INDIRECT WATER HEATER

[75] Inventor: Eric M. Lannes, Kentwood, Mich.

[73] Assignee: Bradford White Corporation, Ambler, Pa.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/950,890

[22] Filed: Oct. 15, 1997

Related U.S. Application Data

[63] Continuation of application No. 08/281,405, Jul. 27, 1994, abandoned.

[51] Int. Cl.[7] .................................................. F28F 11/00

[52] U.S. Cl. ..................... 165/70; 165/133; 165/134.1; 165/163; 126/641; 138/145

[58] Field of Search ..................................... 165/163, 162, 165/134.1, 133, 70; 126/677, 676, 641; 138/146, 145, 139, 127, 104

[56] References Cited

U.S. PATENT DOCUMENTS

| | | | |
|---|---|---|---|
| 1,070,175 | 8/1913 | Ponninghaus | 122/37 |
| 1,240,101 | 9/1917 | Thompson | 237/19 |
| 1,255,835 | 2/1918 | Shaug | 237/19 |
| 1,959,933 | 5/1934 | Simsohn | 122/32 |
| 2,252,046 | 8/1941 | Steele | 158/1 |
| 2,255,956 | 9/1941 | Watt | 237/19 |
| 2,303,197 | 11/1942 | Canfield | 122/17 |
| 2,327,339 | 8/1943 | Chandler | 237/3 |
| 2,345,209 | 3/1944 | Moore | 237/19 |
| 2,348,610 | 5/1944 | Colby | 237/19 |
| 2,348,835 | 5/1944 | Mueller | 237/19 |
| 2,359,547 | 10/1944 | Colby | 237/19 |
| 2,373,731 | 4/1945 | Wilson et al. | 237/19 |
| 2,399,985 | 5/1946 | Chandler | 237/19 |
| 2,533,508 | 12/1950 | Riu | 237/19 |
| 2,539,469 | 1/1951 | Powers | 237/19 |
| 2,569,757 | 10/1951 | Gubson | 122/20 |
| 2,642,046 | 6/1953 | Alexander | 122/16 |
| 2,704,188 | 3/1955 | Bergmann | 237/19 |
| 3,171,597 | 3/1965 | Baier | 237/19 |
| 3,201,045 | 8/1965 | Davidson et al. | 237/19 |
| 3,254,839 | 6/1966 | McClanahan et al. | 237/19 |

(List continued on next page.)

FOREIGN PATENT DOCUMENTS

| | | |
|---|---|---|
| 71574/87 | 11/1987 | Australia . |
| 651530 | 7/1994 | Australia . |
| 2 412 807 | 8/1979 | France . |
| 2 469 667 | 5/1981 | France . |
| 24 30 825 | 1/1976 | Germany . |
| 39 06 715 | 9/1990 | Germany . |
| 57-49760 | 3/1982 | Japan . |

OTHER PUBLICATIONS

Bradford White Brochure No. 550–B–996A, Sep. 1994, p. 2

*Primary Examiner*—Christopher Atkinson
*Attorney, Agent, or Firm*—Austin R. Miller

[57] ABSTRACT

An apparatus for heating a domestic water supply including a glass-lined storage tank for the domestic water supply and having a domestic water inlet port, a domestic water outlet port, and a heat-exchanging coil mounted therein. A heating tube is connected to the heat-exchanging coil to contain a recirculating fluid supply. The heat-exchanging coil within the glass-lined storage tank has a double-wall construction with a non-metallic outer wall in contact with a metallic inner wall. The double-wall prevents mixing of the domestic water supply with the recirculating fluid supply. The apparatus also includes a recirculating fluid heater positioned externally of the glass-lined storage tank to heat recirculating fluid to a temperature sufficient to heat the domestic water supply by heat transfer from the recirculating fluid in the heat-exchanging coil to the domestic water supply in the glass-lined storage tank.

14 Claims, 11 Drawing Sheets

U.S. PATENT DOCUMENTS

| | | | |
|---|---|---|---|
| 3,341,122 | 9/1967 | Whittell, Jr. | 237/19 |
| 3,492,461 | 1/1970 | Lawrence | 165/134.1 X |
| 3,527,293 | 9/1970 | Meisse et al. | 165/70 X |
| 3,545,534 | 12/1970 | Coles et al. | 165/67 |
| 3,793,992 | 2/1974 | Marquez | 122/156 |
| 3,828,847 | 8/1974 | Stein | 165/163 |
| 3,882,693 | 5/1975 | Hiller | 165/70 X |
| 3,896,992 | 7/1975 | Borovina | 237/19 |
| 3,958,755 | 5/1976 | Cleer, Jr. | 237/19 |
| 4,030,540 | 6/1977 | Roma | 165/162 X |
| 4,037,785 | 7/1977 | Madern | 126/400 |
| 4,052,000 | 10/1977 | Honikman | 237/1 A |
| 4,149,673 | 4/1979 | Hapgood | 237/19 |
| 4,158,438 | 6/1979 | Hapgood | 237/19 |
| 4,167,211 | 9/1979 | Haller | 165/162 X |
| 4,193,180 | 3/1980 | Press | 29/157.4 |
| 4,202,406 | 5/1980 | Avery | 165/70 X |
| 4,238,873 | 12/1980 | Frank et al. | 126/433 |
| 4,249,593 | 2/1981 | Bieberbach et al. | 165/70 |
| 4,253,446 | 3/1981 | Miller | 126/435 |
| 4,267,826 | 5/1981 | Hitt, Jr. | 126/440 |
| 4,273,160 | 6/1981 | Lowles | 138/127 X |
| 4,282,861 | 8/1981 | Roark | 126/435 |
| 4,296,799 | 10/1981 | Steele | 165/163 |
| 4,309,982 | 1/1982 | Oquidam | 126/420 |
| 4,328,791 | 5/1982 | Moore | 126/427 |
| 4,345,583 | 8/1982 | Morin | 126/427 |
| 4,353,410 | 10/1982 | Godard et al. | 126/641 X |
| 4,413,615 | 11/1983 | Sigworth, Jr. | 165/70 X |
| 4,426,037 | 1/1984 | Bernstein | 237/19 |
| 4,461,347 | 7/1984 | Layton et al. | 165/133 |
| 4,480,631 | 11/1984 | Kristensen | 126/360 R |
| 4,505,261 | 3/1985 | Hunter | 165/70 X |
| 4,545,365 | 10/1985 | Wetzel, Jr. | 126/433 |
| 4,546,819 | 10/1985 | O'Connor | 165/70 X |
| 4,550,710 | 11/1985 | McDonald, II | 126/362 |
| 4,637,347 | 1/1987 | Troy | 237/19 |
| 4,644,907 | 2/1987 | Hunter | 122/DIG. 13 X |
| 4,738,394 | 4/1988 | Ripka et al. | 237/19 |
| 4,744,412 | 5/1988 | Kim et al. | 165/70 |
| 4,821,682 | 4/1989 | Waters | 237/19 |
| 4,949,680 | 8/1990 | Kale | 122/17 |
| 4,972,902 | 11/1990 | Ninomiya | 165/70 |
| 4,991,876 | 2/1991 | Mulvey | 285/21 |
| 5,037,510 | 8/1991 | Nygards | 202/83 |
| 5,136,985 | 8/1992 | Krowech | 165/162 X |
| 5,178,207 | 1/1993 | Bergqvist et al. | 165/70 |
| 5,228,413 | 7/1993 | Tam | 122/17 |
| 5,277,171 | 1/1994 | Lannes | 126/362 |
| 5,372,185 | 12/1994 | Lannes | 165/70 |
| 5,485,879 | 1/1996 | Lannes | 165/70 |
| 5,660,165 | 8/1997 | Lannes | 165/70 X |

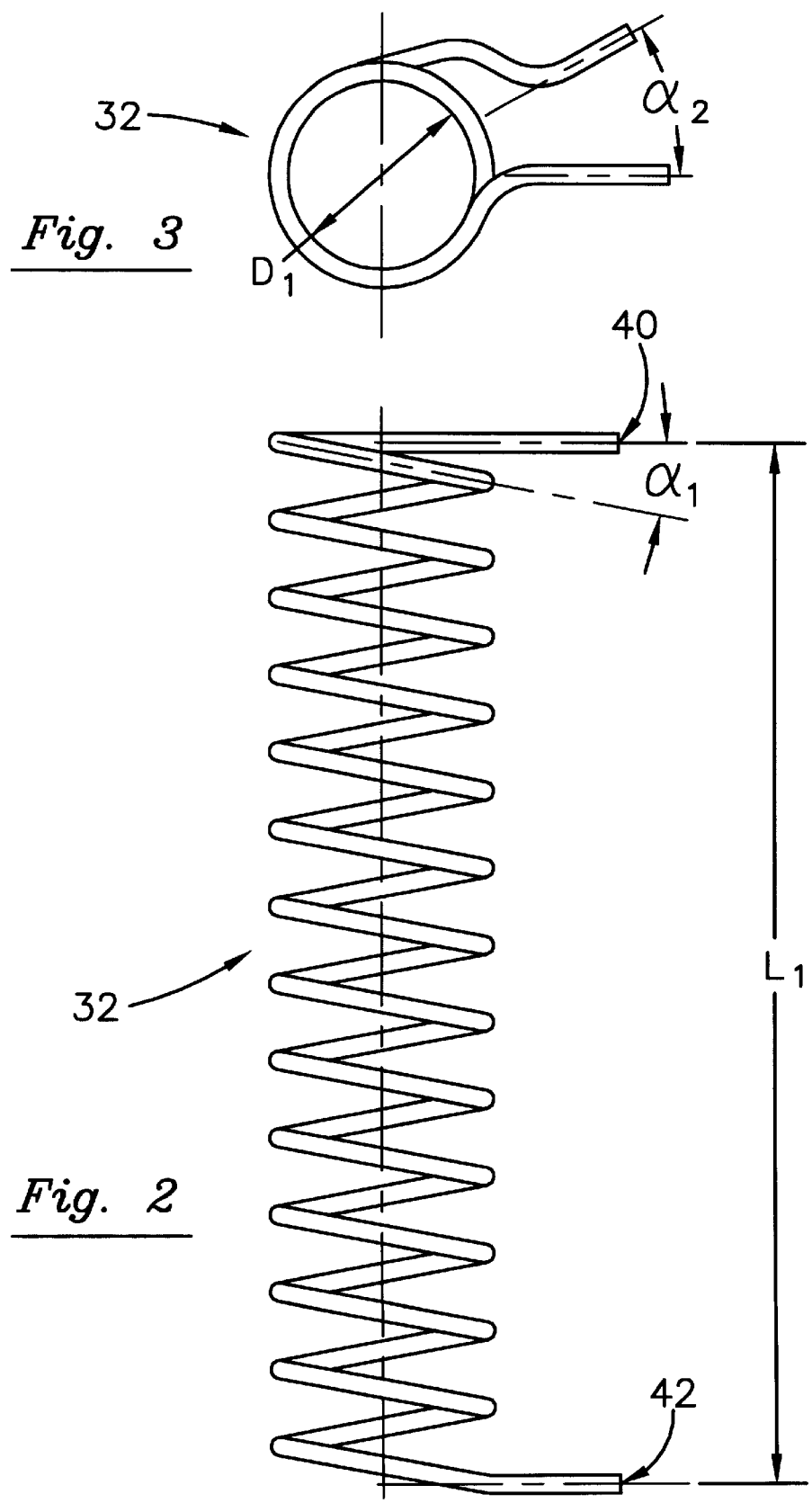

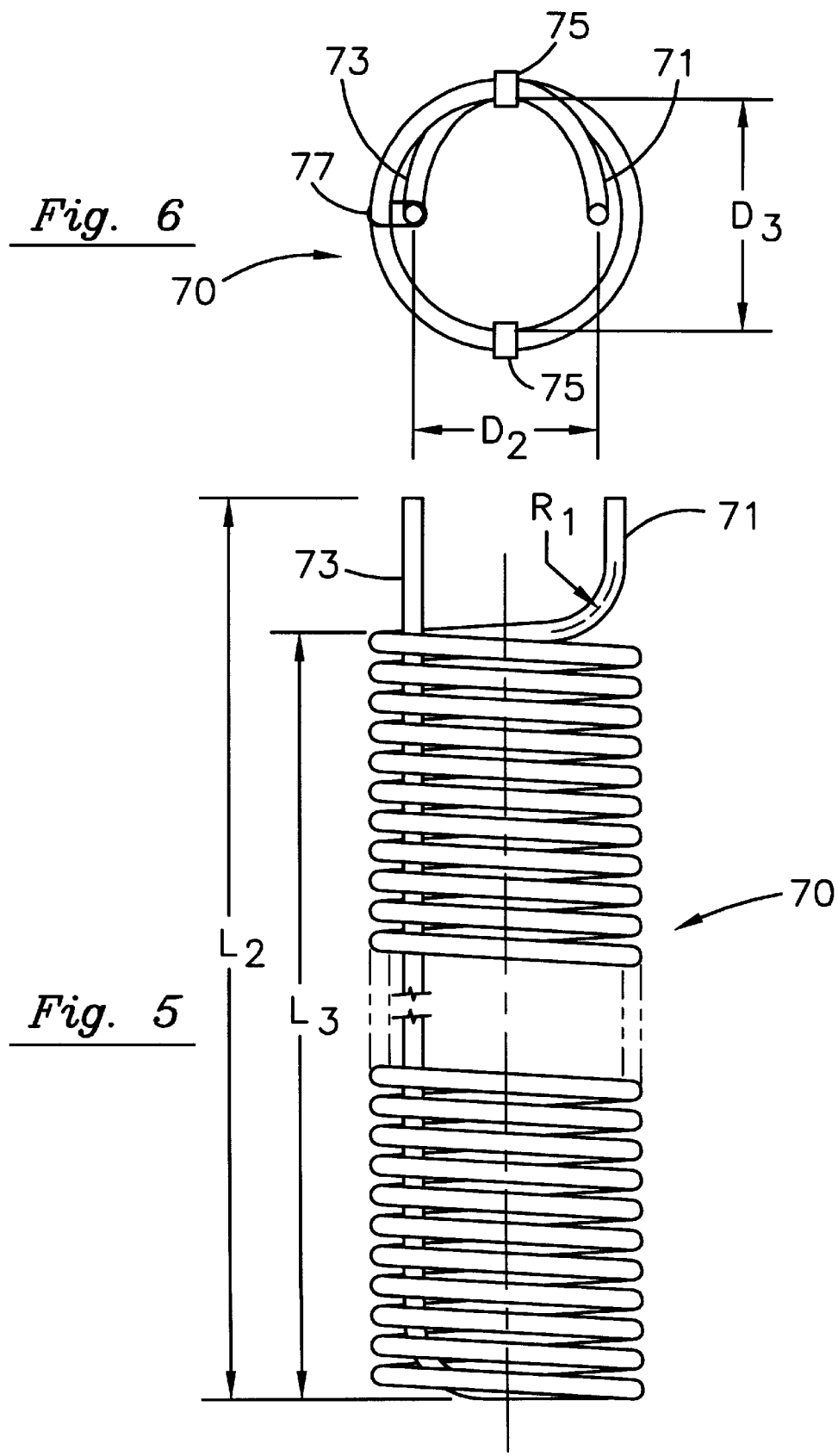

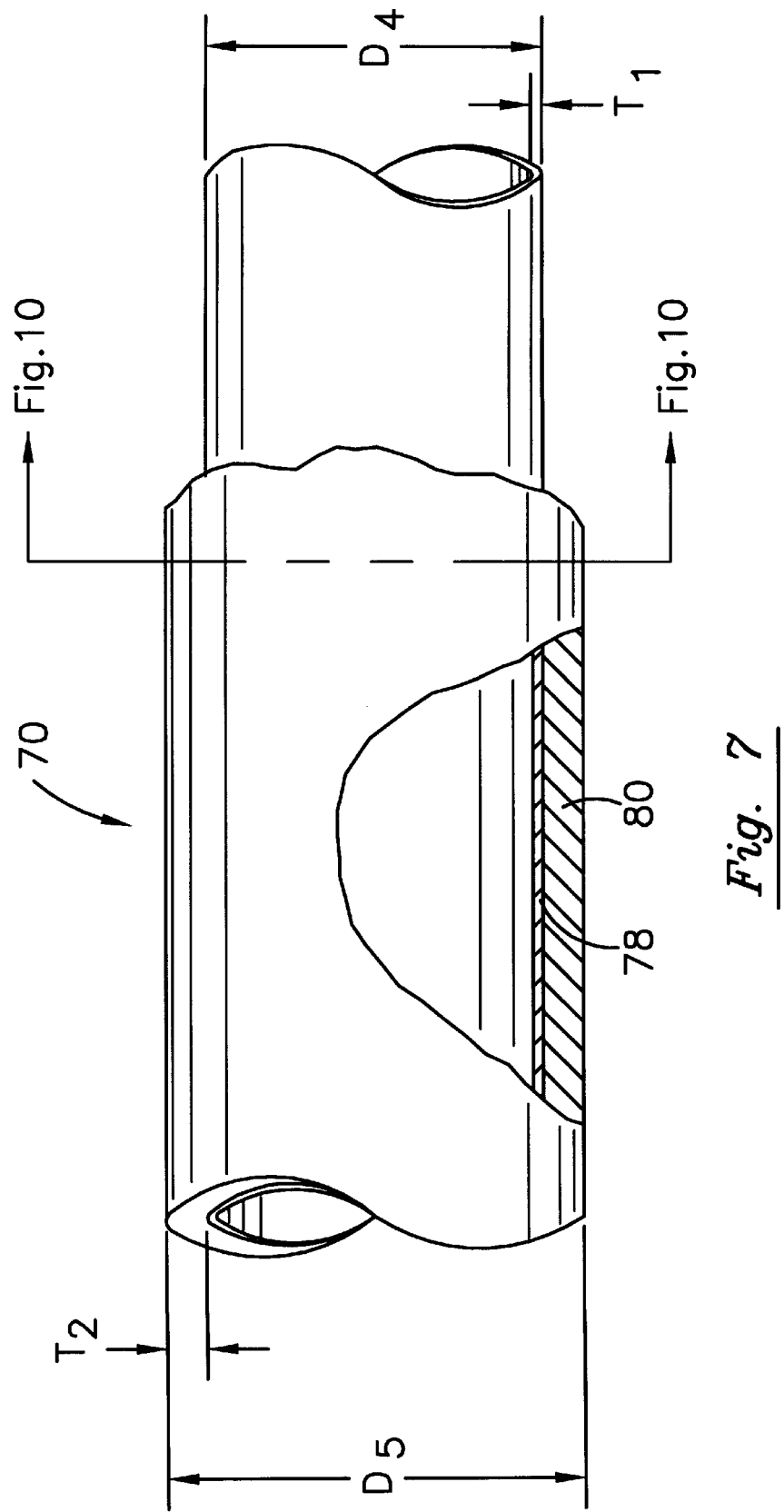

INDIRECT WATER HEATER

This application is a continuation of application Ser. No. 08/281,405, filed Jul. 27, 1994, now abandoned.

BACKGROUND OF THE INVENTION

This invention relates to an indirect heating system for residential or commercial use providing an indirect heat source for domestic water in a glass-lined storage tank. The indirect heat source heats a recirculating fluid supply which transfers heat to domestic water in the glass-lined storage tank.

FIELD OF THE INVENTION

There has long been a need for a domestic water heating system having an indirect heat source for heating a stored supply of domestic water. Previous attempts to provide such an indirect heating system failed to produce a reliable, efficient, and long-lasting system.

The apparatus disclosed by Stein, in U.S. Pat. No. 3,828,847, was intended to heat stored domestic water. The Stein apparatus used liquid from a hot liquid reservoir to heat water in a cylindrical tank. The cylindrical tank contained a helically coiled cylindrical conduit formed from copper. Hot liquid flowed from the hot liquid reservoir through conduits and into the coiled cylindrical conduit.

Systems like the Stein apparatus were not adapted for efficient long-term use and degradation of such systems may lead to mixing of the domestic water supply with water or fluid not suited for domestic consumption. Specifically, the structure of prior systems lacked an adequate barrier for long-term protection against the mixing of domestic water and other water supplies. Moreover, prior systems accelerated the decay of the water storage tank, thereby increasing maintenance requirements and reducing cost effectiveness. For these reasons, prior systems often were not capable of economical or practical use.

Accordingly, there has been a long-standing and thus far unsatisfied need for an inexpensive and efficient indirect water heating system for heating domestic water in a glass-lined storage tank.

OBJECTS OF THE INVENTION

It is an object of this invention to provide a water heating system that overcomes the problems associated with prior systems.

It is another object of this invention to provide an indirect water heating system for residential or commercial use capable of heating domestic water in a glass-lined storage tank.

It is still another object of this invention to provide an indirect water heating system which prevents the mixing of domestic water and water or other fluid not suited for domestic consumption.

It is a further object of this invention to provide an indirect water heating system without degrading water storage tank performance or compromising water storage tank longevity.

It is another object of this invention to provide an indirect water heating system which prevents the exposure of stored water to dissimilar metals and the accelerated corrosion associated therewith.

Finally, it is another object of this invention to provide an indirect water heating system characterized by both low manufacturing and maintenance costs.

Other objects and advantages of the invention will become apparent to those skilled in the art from the drawings, the detailed description of preferred embodiments and the appended claims.

SUMMARY OF THE INVENTION

The indirect water heating system comprises a heat exchanger incorporated into a glass-lined water storage tank. The heat exchanger is connected to an external recirculating fluid circuit wherein recirculating fluid is heated by a remote heat source.

The heat exchanger in the glass-lined water storage tank has a coiled construction which terminates at the storage tank wall, top and/or bottom. The heat exchanger coil passes through and is substantially submerged in the domestic water so that heat is transferred from heated recirculating fluid in the coil to domestic water in the glass-lined water storage tank.

The heat exchanger coil has a double-wall construction, having a non-metallic outer wall surrounding a metallic inner wall. The double-wall protects the domestic water supply from contamination by the recirculating fluid. The non-metallic outer wall in conjunction with a dielectric fitting also permits dielectric mounting of the heat exchanger coil within the glass-lined water storage tank to prevent the accelerated corrosion which occurs when water is exposed to dissimilar metals. The inner wall's metallic construction provides increased conductive heat transfer and structural strength.

BRIEF DESCRIPTION OF THE DRAWINGS

FIG. 2 shows a side view of the coiled heat exchange tube used in the indirect water heating system shown in FIG. 1.

FIG. 3 shows a top view of the coiled heat exchange tube used in the indirect water heating system shown in FIG. 1.

FIG. 5 shows a side view of the coiled heat exchange tube used in the indirect water heating system shown in FIG. 4.

FIG. 6 shows a top view of the coiled heat exchange tube used in the indirect water heating system shown in FIG. 4.

FIG. 7 shows a side view of a portion of an embodiment of the heat exchange tube with a cut-away cross-sectional view of the coiled heat exchange tube's double-wall.

DETAILED DESCRIPTION OF THE INVENTION

Figure 1:
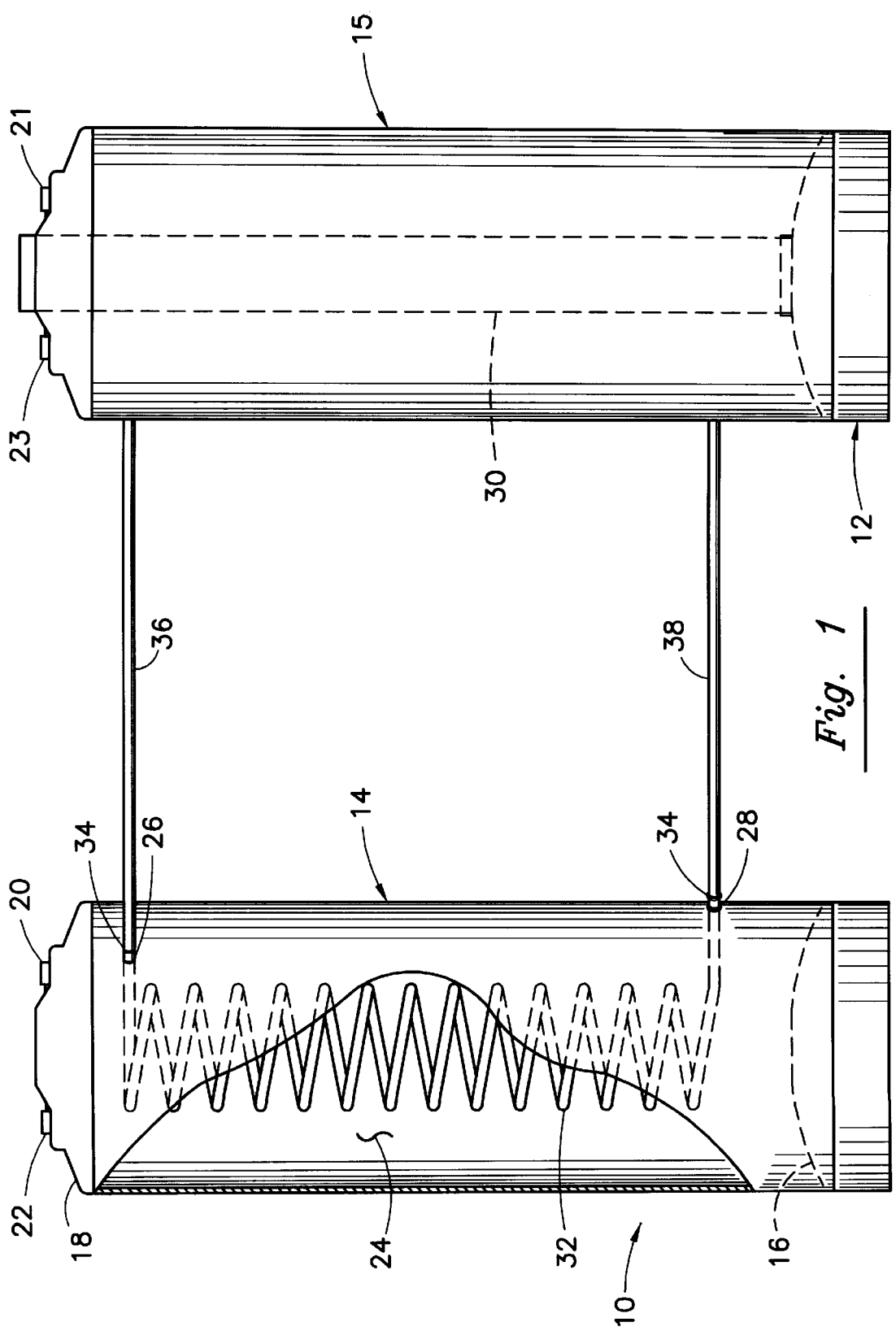
FIG. 1 shows a side view of one embodiment of the indirect water heating system with a portion of the water storage tank wall removed.

The following description is intended to refer to the specific embodiments of this invention that are illustrated in the drawings. This description is not intended to define or limit the scope of the invention, which is defined separately in the claims that follow.

Referring to FIG. 1, the number 10 designates one embodiment of the indirect water heating system. Indirect water heating system 10 has a glass-lined water storage tank 14 adapted to contain a domestic water supply. Water storage tank 14 has a bottom 16, a top 18 and a wall 24. Water storage tank top 18 has a cold water inlet port 20 through which water is introduced into water storage tank 14. A hot water outlet port 22 is also provided in water storage tank top 18 so that hot water may be drawn from water storage tank 14 for consumption. Wall 24 of water storage tank 14 has a tank inlet port 26 in the top portion of wall 24 and a tank outlet port 28 located toward the bottom of wall 24.

A coiled heat exchange tube 32 is mounted within water storage tank 14. Coiled heat exchange tube 32 terminates at a dielectric fitting assembly 34 at tank inlet port 26 and also at a dielectric fitting assembly 34 located at tank outlet port 28. Pipe section 38 runs from dielectric fitting assembly 34 at tank outlet port 28 to a fluid heater 15. Fluid heater 15 is preferably a water heating appliance and will be referred to hereinafter as water heater 15. Pipe section 36 runs from water heater 15 to water storage tank 14, terminating at dielectric fitting assembly 34 at tank inlet port 26.

Water heater 15 has a heat source 12. Heat source 12 is preferably a direct-fired burner of the type traditionally used in standard water heaters and boilers. Although oil or other fuels are contemplated, heat source 12 is most preferably a direct-fired gas burner and water heater 15 is preferably a gas-fired boiler. At least one flue 30 runs between the bottom and top of water heater 15 to provide exhaust of combustion gases from heat source 12.

Although indirect water heating system 10 shown in FIG. 1 preferably utilizes a direct-fired oil burner for heat source 12 to heat water in water heater 15, an electric or other water heating system can also be used as described below.

Referring to FIG. 2, coiled heat exchange tube 32 has a plurality of coils inclined at an angle of incline $\alpha_1$. Coiled heat exchange tube 32 has an overall length $L_1$ and terminates at an inlet portion 40 and an outlet portion 42. FIG. 3 illustrates coiled heat exchange tube 32 as viewed from the top. The inlet portion 40 and outlet portion 42 of coiled heat exchange tube 32 shown in FIG. 2 are radially separated by an angle $\alpha_2$ shown in FIG. 3.

Figure 4:
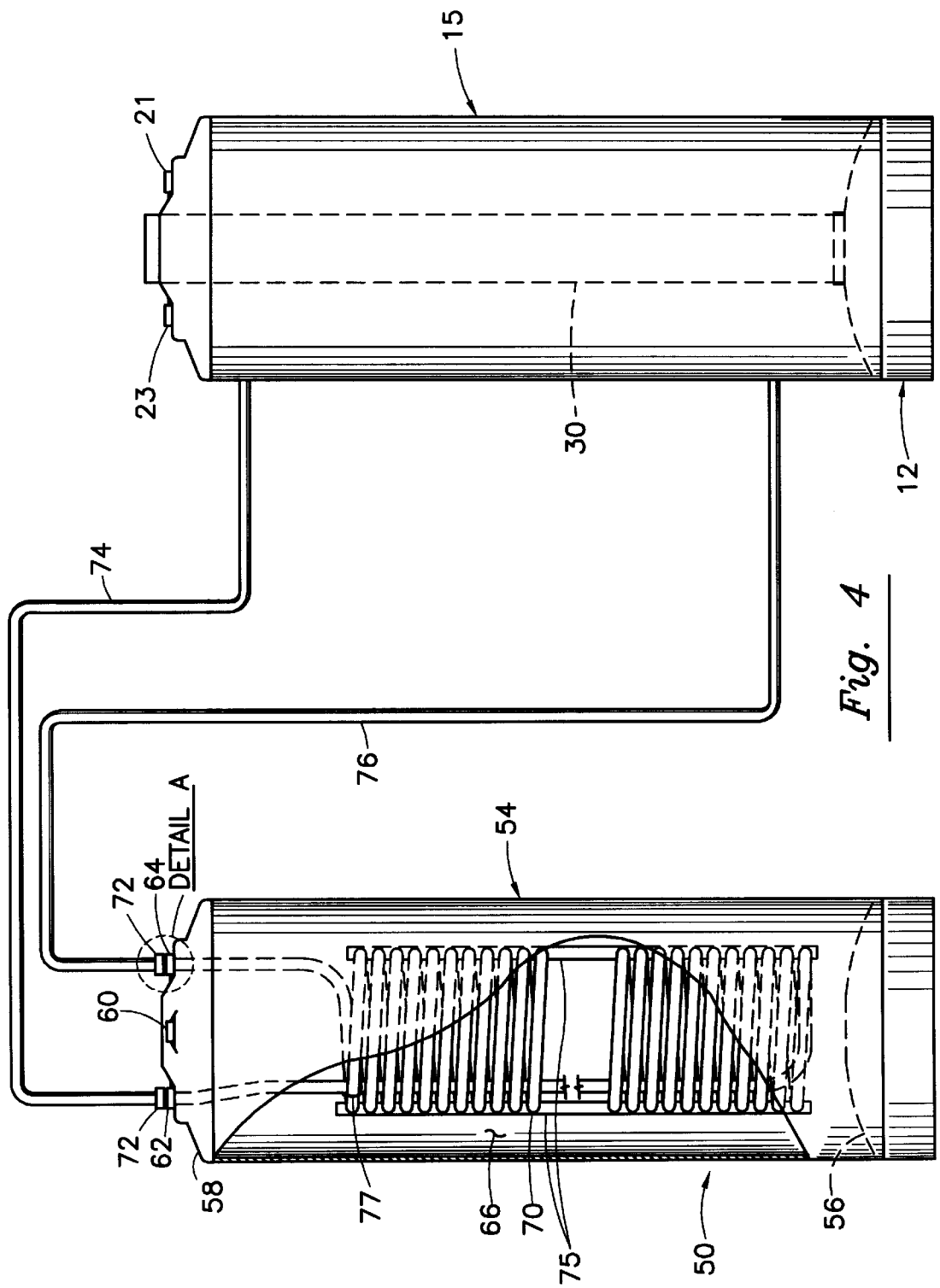
FIG. 4 shows a side view of another embodiment of the indirect water heating system with a portion of the water storage tank wall removed.

Referring to FIG. 4, the number 50 designates another embodiment of the indirect water heating system. Water heater system 50 stores and heats domestic water in a glass-lined water storage tank 54. Water storage tank 54 has a bottom 56, a top 58 and a wall 66. Top 58 of water storage tank 54 has a hot water outlet port 60 as well as a cold water inlet port (not shown). Top 58 of water storage tank 54 also has a tank inlet port 62 and a tank outlet port 64. A coiled heat exchange tube 70 terminates at a dielectric fitting assembly 72 located at tank inlet port 62 and also terminates at a dielectric fitting assembly 72 located at tank outlet port 64.

In this embodiment of the invention, the coiled heat exchange tube 70 enters and exits water storage tank 54 through water storage tank top 58. Pipe section 74 extends from the water heater 15 (as in FIG. 1) and terminates at dielectric fitting assembly 72 at tank inlet port 62. Pipe section 76 runs from dielectric fitting 72 at tank outlet port 64 and travels to water heater 15.

Two coil spacing brackets 75, 75 are preferably used to engage coiled heat exchange tube 70. Coil spacing brackets 75, ideally mounted 180° apart as shown in FIG. 6, provide support for coiled heat exchange tube 70 during shipping, handling and operation of indirect water heating system 50. Coil spacing brackets 75 also maintain spacing between adjacent coils of tube 70 and reduce or eliminate any noise caused by coil vibration. Coil spacing brackets 75 also maximize heat transfer surface area by preventing contact between adjacent coils. Another benefit of coil spacing brackets 75 is improved water circulation between adjacent coils, thereby decreasing stratification by permitting horizontal water flow through water storage tank 54. Also, brackets 75 increase coil rigidity to assist in the tank manufacturing process. While two coil spacing brackets 75 are shown, the use of one, three or more coil spacing brackets 75 is also contemplated.

Figure 11:
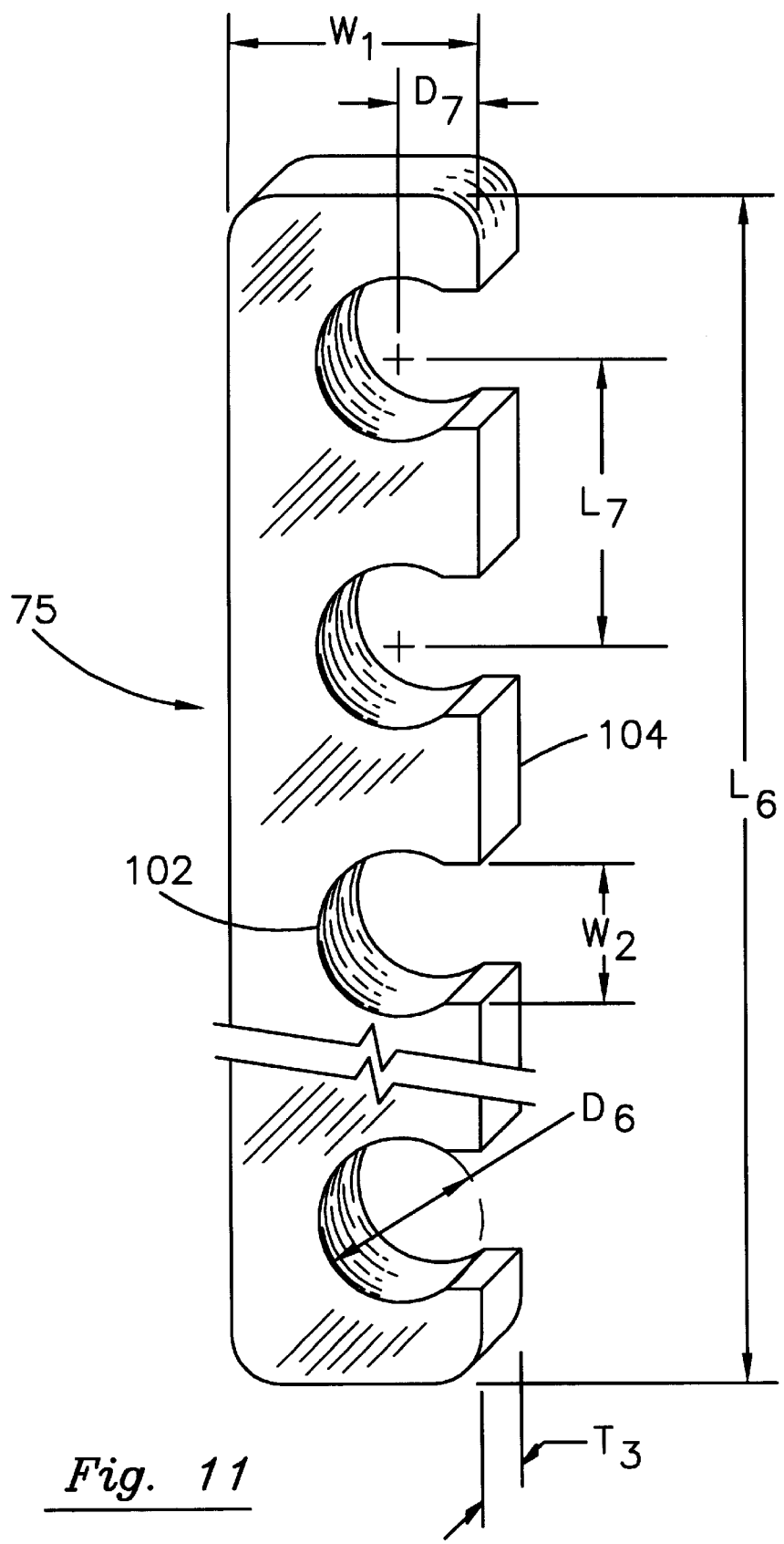
FIG. 11 shows a perspective view of the coil spacing bracket embodiment used in the indirect water heating system shown in FIG. 4.

Referring to FIG. 11, each coil spacing bracket 75 preferably has an overall length $L_6$, a width $W_1$ of approximately 1.5 inch, and a thickness $T_3$ of approximately 0.18 inches but other dimensions may be used. Length $L_6$ depends upon the number of coils in heat exchange coil 70. Coil spacing bracket 75 has coil engaging notches 102 separated and defined by spacers 104. The number of coil engaging notches 102 in coil spacing bracket 75 preferably matches the number of coils in heat exchange tube 70.

Coil engaging notches 102 of coil spacing bracket 75 are sized and shaped to provide snap-in engagement between bracket 75 and tube 70. For example, notches 102 of bracket 75 preferably have a width $W_2$ of approximately 0.650 inches and a diameter $D_6$ of approximately 0.700 inches to permit snap-in engagement of tube 70 having outside diameter $D_5$ (FIG. 7) of about 0.665 inches.

The circular portions of notches 102 preferably have centers located a distance $D_7$ of approximately 0.400 inches from the edge of bracket 75 and are separated from each other by a length $L_7$ of approximately 0.960 inches. Bracket 75 can be provided with any dimensions that permit snap-in engagement of coiled tubing 70 or any other known means of engaging bracket 75 with tubing 70. In fact, bracket 75 can even be replaced with a strap applied around the coils of tube 70 to maintain length $L_3$ (FIG. 5), utilizing the spring effect of the coils to maintain spacing between adjacent coils. Any of the foregoing dimensions may be changed to suit.

A retaining strap 77 (shown in FIGS. 4 and 6) is preferably provided to secure the top coil of tube 70 to the leg of coiled heat exchange tube 70 which runs vertically from the bottom coil to tank inlet port 62. Retaining strap 77 assures a constant dimension $D_2$ between outlet and inlet portions 71 and 73 of coil 70 (FIG. 6). Retaining strap 77 also prevents damage to coil 70 during shipment of indirect water heating system 50.

Retaining strap 77 can be formed from a variety of materials and have a variety of dimensions. Preferably, retaining strap 77 is formed from nylon strip having a width of ⅛ inches and a thickness of 0.020 inches though various other dimensions may be used. Retaining strap 77 is preferably attached as shown in FIG. 6, but can be applied in any manner to reduce relative movement between the vertically running leg, upper coils and outlet and inlet portions of tube 70.

Referring to FIG. 5, coiled heat exchange tube 70 has an overall length $L_2$ and a coiled length $L_3$ which depend upon the size and capacity of water storage tank 54 (FIG. 4). A bend radius $R_1$ is provided near outlet portion 71 of the coiled heat exchange tube 70 and at the bottom of inlet portion 73 of coil 70. Bend radius $R_1$ is preferably about 3 inches.

Referring to FIG. 6, distance $D_2$ between the centerlines of portions 71 and 73 of coil 70 is preferably about 11 inches but may vary depending upon the size of water storage tank 54. Coil inner diameter $D_3$ is preferably about 12.25 inches but will also vary depending upon water storage tank size and capacity. The overall heat exchange tube length and coil diameter may be changed to assure sufficient tube surface area for adequate heat transfer between heated fluid in coiled heat exchange tube 70 and domestic water in water storage tank 54.

FIG. 7 illustrates the preferred double-wall construction of heat exchange tube 70 and heat exchange tube 32 (FIG. 2). Heat exchange tube 70 has a tubing inner wall 78 having an inner wall thickness $T_1$ and an inner wall outside diameter $D_4$. Tubing inner wall 78 is preferably formed from a soft metallic material such as copper or aluminum so that coiled heat exchange tube 70 is provided with a means for support to prevent kinking while being soft enough to permit the formation of coiled heat exchange tube 70 as shown in FIG. 5. Metallic tubing inner wall 78 also provides conductive heat transfer to increase the output of indirect water heating system 50. Tubing inner wall 78 preferably has thickness $T_1$ of about 0.035 inches and outside diameter $D_4$ of about 0.625 inches, but may be provided with a variety of suitable dimensions.

Tubing outer wall 80 fits snugly over tubing inner wall 78 and has an outer wall thickness $T_2$ and an outside diameter $D_5$. Tubing outer wall 80 is preferably formed from a non-metallic material such as high density polyethylene and may take the form of a co-extruded coating. Tubing outer wall 80 preferably has thickness $T_2$ of approximately 0.020 inches and an outside diameter $D_5$ of about 0.665 inches, but a variety of dimensions may be used.

Figure 10:
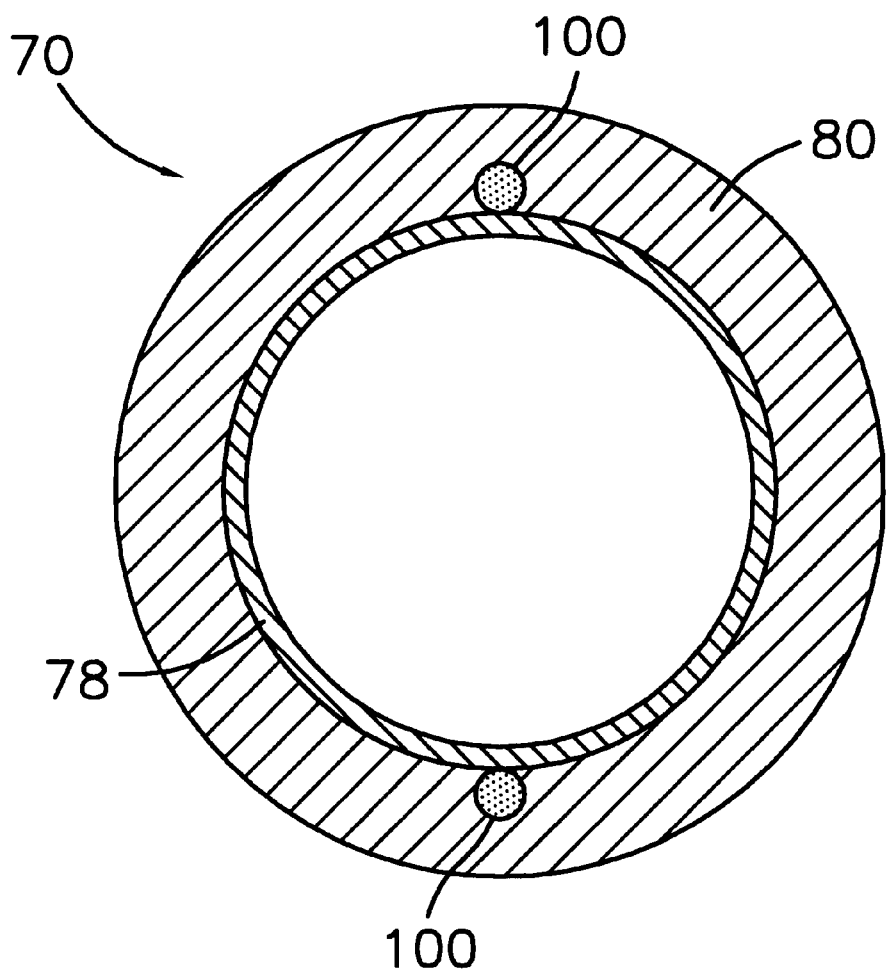
FIG. 10 shows a cross-sectional view of the coiled heat exchange tube as indicated in FIG. 7, illustrating a preferred double-wall construction.

FIG. 10 illustrates additional preferred features of heat exchange tube 70. Two monofilaments 100 are preferably placed between tubing inner and outer walls 78 and 80 of heat exchange tubing 70. Monofilaments 100 provide an improved path along which domestic water or heated fluid trapped between inner and outer walls 78 and 80 can travel out of water storage tank 54. Monofilaments 100 can be applied axially or spirally to provide an axial or spiral water passage.

Monofilaments 100 are preferably extended over the full length of heat exchange tube 70 and positioned 180° apart. Monofilaments 100 are preferably nylon thread having a diameter in the range of from about 0.009 inch to about 0.011 inch. It is apparent, however, that a thread, wire, or strip of any suitable material and having any cross-sectional shape or dimension can be used in the place of nylon monofilament 100 so long as it provides an improved leak path between inner and outer walls 78 and 80 over a substantial length of heat exchange tube 70. It is also apparent that any number of monofilaments 100 can be inserted either as outer wall 80 is extruded over inner wall 78 or by some other method, depending of course on how heat exchange tube 70 is formed.

FIG. 7 along with FIG. 10 illustrates the double-wall heat exchange tube 70 wherein the inner surface of non-metallic outer tube 80 contacts the outer surface of metallic inner tube 78 except at at least one circumferential portion of metallic inner tube 78 wherein a path 100 is defined along the length of said double-wall heat exchange tube 70 between said non-metallic outer tube 80 and said metallic inner tube 78.

Figure 8:
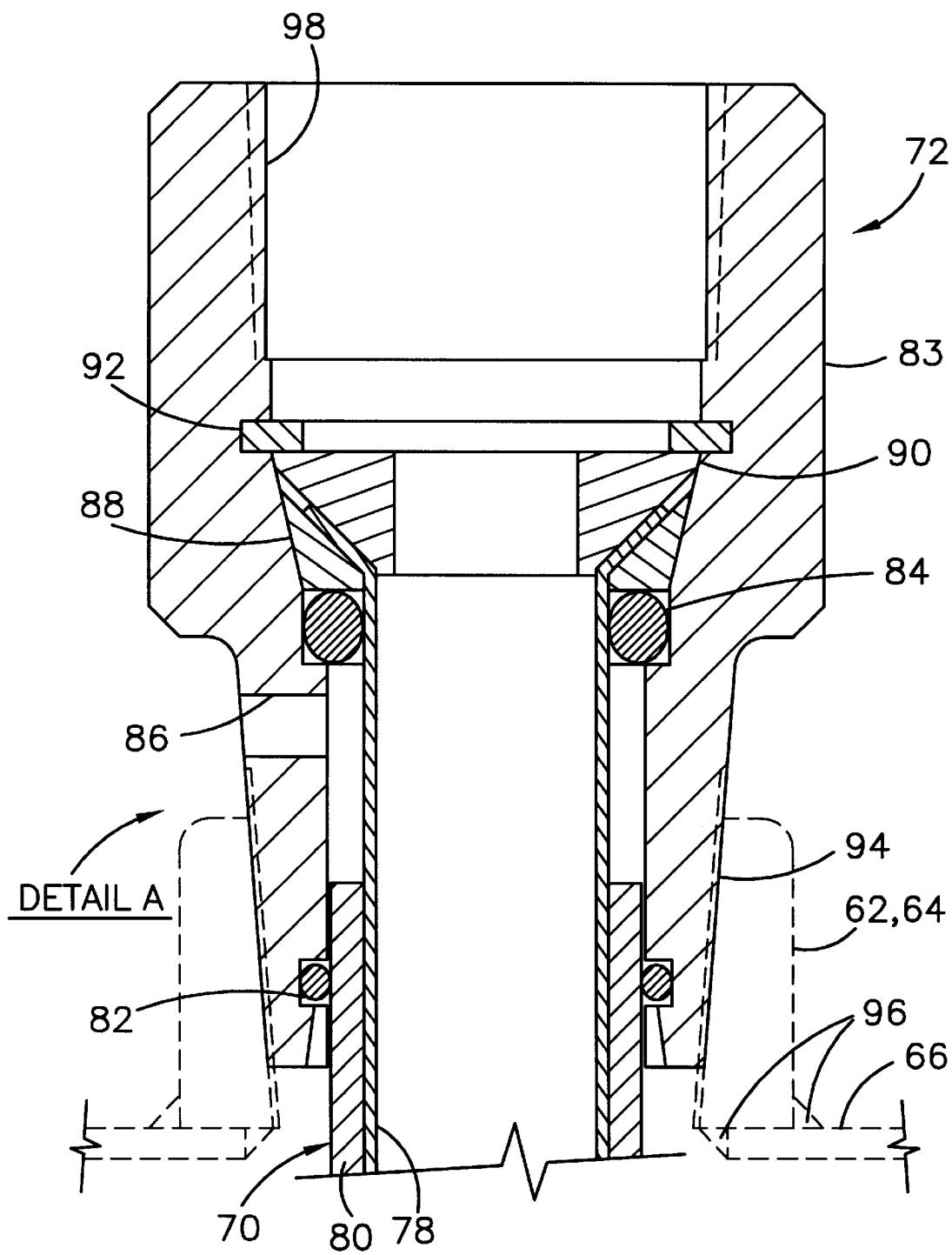
FIG. 8 shows a cross-sectional side view of an embodiment of the dielectric fitting assembly indicated by "Detail A" in FIG. 4, illustrating the termination and mounting of the coiled heat exchange tube.

FIG. 8 provides a cross-sectional view of Detail "A" of indirect water heating system 50 shown in FIG. 4. Dielectric fitting assembly 72 provides a termination for heat exchange tube 70 at tank inlet port 64 and tank outlet port 62 in water storage tank top 58 shown in FIG. 4. Dielectric fitting assembly 72 provides a structural mounting for coiled heat exchange tube 70 while maintaining isolation between tube inner wall 78 and wall 66 of water storage tank 54. An O-ring 82 captured within a groove in the steel fitting 83 provides a seal against the outside surface of outer wall 80 of heat exchange tube 70. A second O-ring 84, also captured within steel fitting 83, creates a seal around the outside surface of inner wall 78 of heat exchange tube 70. A relief hole 86 positioned between O-ring 82 and O-ring 84 provides a path for the escape of domestic water or recirculating fluid that may build-up between inner wall 78 of heat exchange tube 70 and inner surface of steel fitting 83. Relief hole 86 will also provide an escape for domestic water or heated fluid that travels along the passageway formed by optional monofilaments 100 captured between tubing inner and outer walls 78 and 80 (FIG. 10). Dielectric fitting assembly 72 is preferably capable of sealing against hydrostatic pressures approaching and even exceeding 300 psi.

In order to prevent axial movement of heat exchange tube 70 within steel fitting 83, there are provided two plastic spacers which capture inner wall 78 of heat exchange tube 70. A first plastic spacer 88 forms an upper end of a groove in which O-ring 84 is seated. First plastic spacer 88 also prevents movement of heat exchange tube 70 into water storage tank 54. A second plastic spacer 90 is positioned to prevent the axial movement of heat exchange tube 70 outward from water storage tank 54. The exposed end of inner wall 78 of heat exchange tube 70 terminates in a position remote from the inner surface of steel fitting 83 so as to maintain dielectric isolation. A retaining ring 92 is positioned within a groove in steel fitting 83 to capture first and second plastic spacers 88 and 90.

Male pipe threads 94 on steel fitting 83 are provided to permit sealing engagement with tank ports 62 and 64, indicated with phantom lines in FIG. 8. Tank ports 62 and 64 are attached to wall 66 of water storage tank 54 by means of welds 96 or in any other suitable manner. Female pipe threads 98 are provided at the opposite end of steel fitting 83 to provide for sealing connection with piping components which lead to and from water heater 15 so that heated fluid can be circulated to and from heat exchange tube 70 mounted in water storage tank 54.

O-rings 82 and 84 are preferably formed from E.P.D.M. having a durometer of approximately 70. However, O-rings 82 and 84 can be any material capable of providing a pressure seal while withstanding the elevated temperatures generated in water heating or storage systems. In fact, O-rings 82 and 84 can be replaced with any known sealing means. First and second plastic spacers 88 and 90 are preferably formed from acetal copolymer, but may be formed from any other known electrically insulating material.

Figure 9:
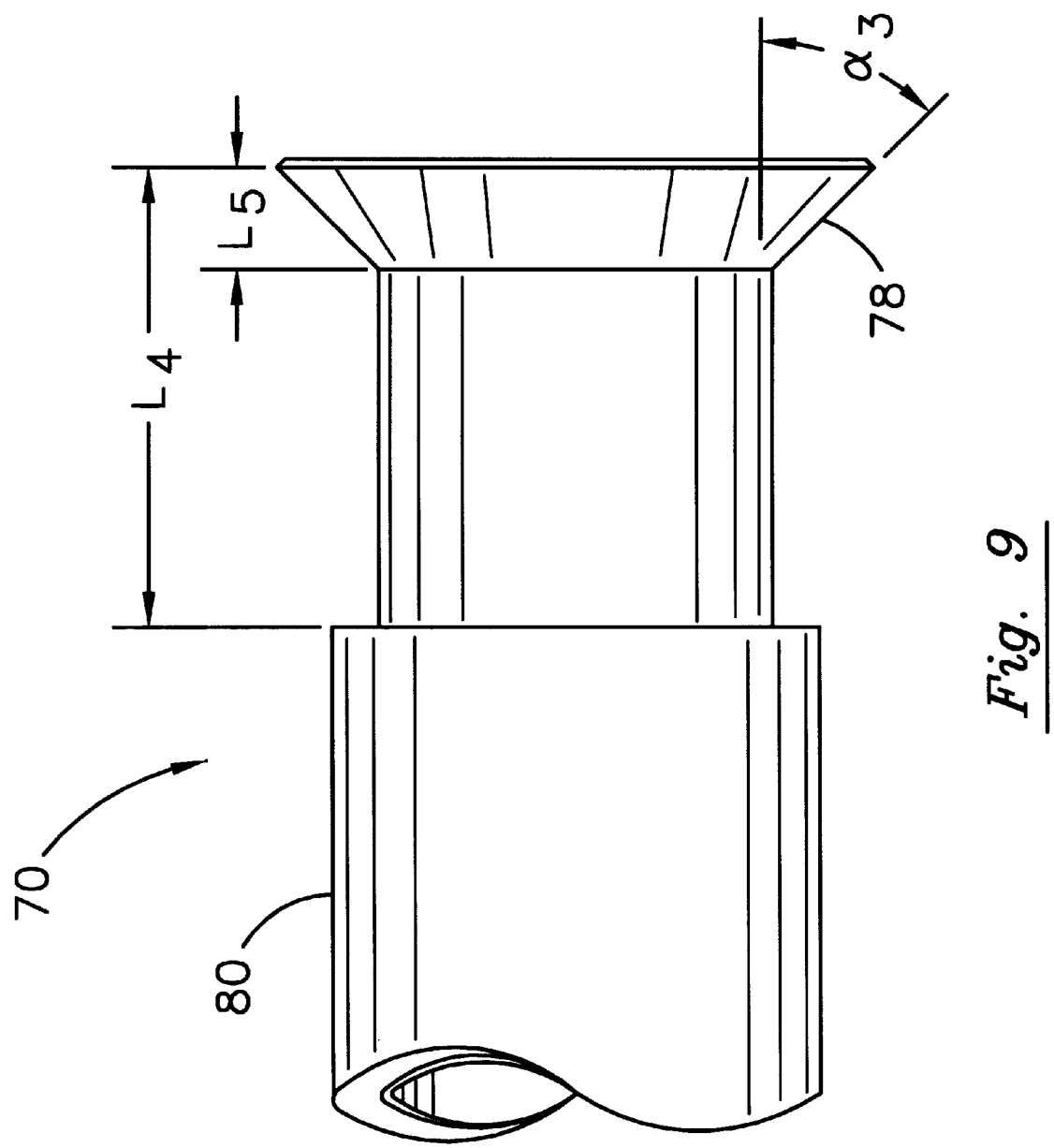
FIG. 9 shows a side view of one end of the coiled heat exchange tube shown in FIG. 7, illustrating the preparation of the coiled heat exchange tube for mounting in the dielectric fitting assembly shown in FIG. 8.

FIG. 9 illustrates the manner in which the ends of heat exchange tube 70 are prepared for mounting within dielectric fitting assembly 72 shown in FIG. 8. So that a seal can be made against inner and outer walls 78 and 80 of heat exchange tube 70, outer wall 80 is stripped from inner wall 78 for a length $L_4$. This strip length $L_4$ is preferably about 1 inch.

In order to allow for the mounting of heat exchange tube 70 within dielectric fitting assembly 72 shown in FIG. 8, the end portion of inner wall 78 must be flared so that first and second plastic spacers 88 and 90 can capture inner wall 78 to prevent axial movement. O-rings 82 and 84 are preferably installed over inner and outer walls 78 and 80 before inner wall 78 is flared. Inner wall 78 is flared over a length $L_5$ and at an angle $\alpha_3$. Flare length $L_5$ is preferably about 0.296 inches and angle $\alpha_3$ is preferably greater than about 45°.

Monofilaments 100 (not shown in FIG. 9) are preferably trimmed flush with the trimmed edge of stripped outer wall 80. Monofilaments 100 may, however, extend beyond stripped outer wall 80 and into the annular space below O-ring 84 (FIG. 8).

Figure 12:
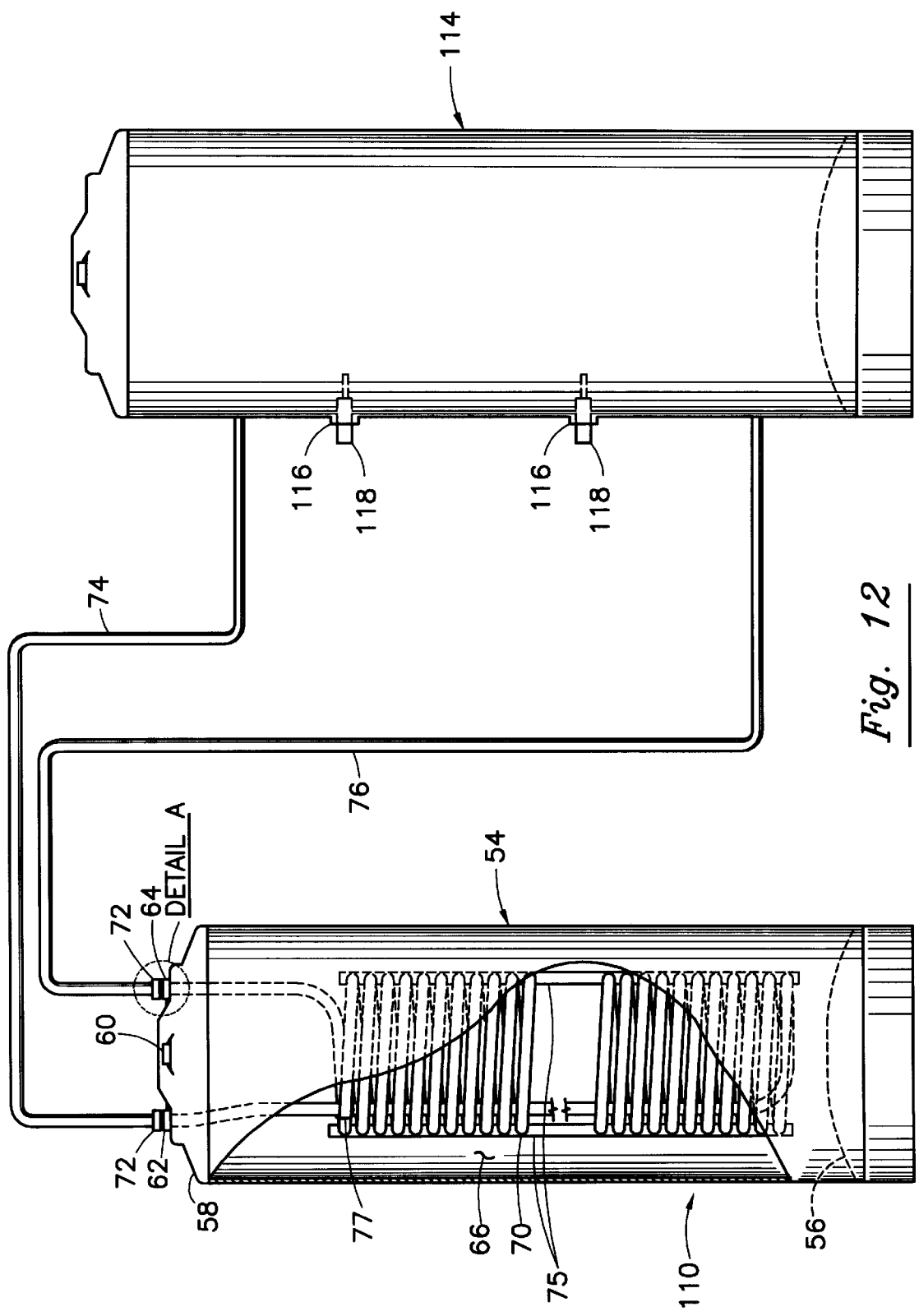
FIG. 12 shows a side view of yet another embodiment of the indirect water heating system with a portion of the water storage tank wall removed.

Referring to FIG. 12, the number 110 designates yet another embodiment of the indirect heating system. Water heating system 110 is similar to water heating system 50 (FIG. 4) except that system 110 utilizes an electric water heater 114 rather than a direct-fired heater.

Ports 116,116 in electric water heater 114 are provided for mounting of electric water heating elements 118,118. Although heating elements 118 are shown at ports 116 in the wall of water heater 114, ports 116 and elements 118 can be located at any other surface or combination of surfaces of water heater 114. Similarly, any number of heating elements 118 can be provided, depending on the location of heating elements 118 and the required heat supply.

Figure 13:
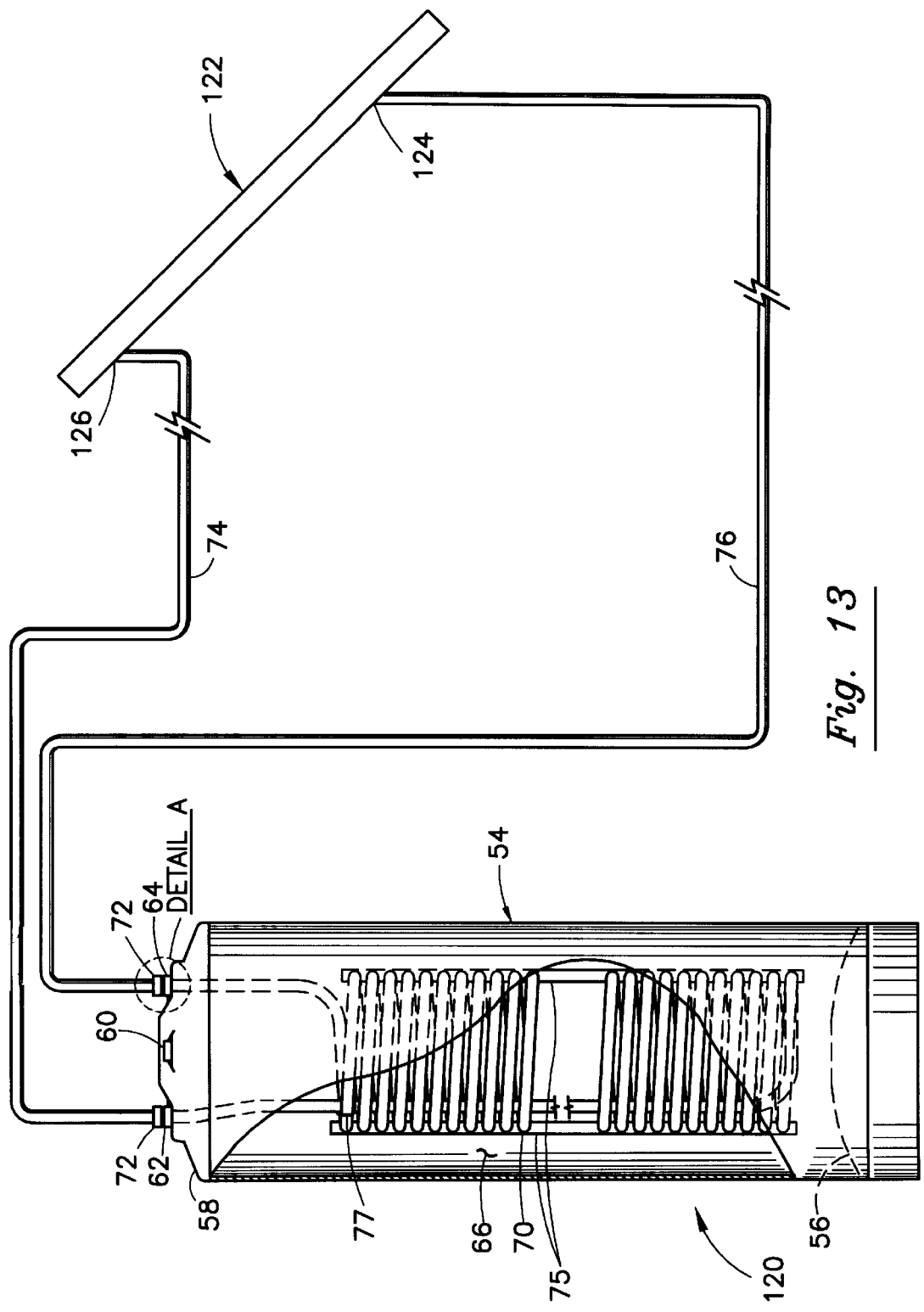
FIG. 13 shows a side view of another embodiment of the indirect water heating system with a portion of the water storage tank wall removed.

Referring to FIG. 13, yet another embodiment of the indirect heating system is generally designated by 120. Indirect water heating system 120 is similar to water heating system 50 (FIG. 4) except that system 120 utilizes a solar water heater 122. Specifically, pipe section 74 extends from an outlet port 126 in solar heater 122 and runs to dielectric fitting assembly 72 located at tank inlet port 62. Similarly, pipe section 76 runs from dielectric fitting 72 at tank outlet port 64 and travels to an inlet port 124 in solar heater 122. Solar heater 122 can be any known solar collector system including, for example, the solar collector described in Wetzel, Jr., U.S. Pat. No. 4,545,365, incorporated herein by reference. Solar heater 122 can of course be substituted with any other known solar collection system.

It is important to note that, although any suitable fluid can be circulated through the solar heater circuit of indirect water heating system 120, a refrigerant is preferably used.

The operation of an indirect water heating system according to this invention will now be described with reference to FIG. 1. Water or any other suitable fluid is supplied to and withdrawn from water heater 15 through cold water inlet port 21 and hot water outlet port 23. The water is heated by heat source 12 which is most preferably a combustible fuel burner. Water in water heater 15 travels from water heater 15 through pipe section 36 to water storage tank 14. Water enters coiled heat exchange tube 32 in water storage tank 14 through dielectric fitting assembly 34 at tank inlet port 26. The heated water in coiled heat exchange tube 32 travels downwardly and exits water storage tank 14 through dielectric fitting assembly 34 at tank outlet port 28. The water completes its circuit by traveling through pipe section 38 and into water heater 15.

A domestic water supply is provided in water storage tank 14 through cold water inlet port 20. Heated domestic water is removed from water storage tank 14 through hot water outlet port 22. The domestic water supply within water storage tank 14 is heated by means of heat transfer from a heated fluid in coiled heat exchange tube 32.

Hot water or fluid from water heater 15 is continuously recirculated as described above and can also be drawn out of water heater 15 through outlet port 23. Such water removal can be for the purpose of replenishing the circulating water supply with fresh water or for other purposes including circulation through a radiant space heating system or other purposes appropriate for water that may be unfit for domestic consumption.

Hot domestic water drawn from water storage tank 14 through outlet port 22 is used for domestic consumption and replenished by addition of cold water through inlet port 20.

Indirect water heating system 50 shown in FIG. 4 operates in the same manner as indirect heating system 10. However, heated recirculating fluid is introduced into water storage tank 54 through dielectric fitting assembly 72 at tank inlet port 62 located in the top 58 of water storage tank 54. Also, hot recirculating fluid exits water storage tank 54 through dielectric fitting 72 at tank outlet port 64, also located in top 58 of water storage tank 54. Accordingly, heated recirculating fluid circulates through water storage tank 54 in coiled heat exchange tube 70 which is supported by dielectric fittings 72 mounted to top 58 of water storage tank 54.

The indirect water heating system 110 shown in FIG. 12 operates in the same manner as indirect water heating system 50 except that the heated recirculating fluid is heated in electric water heater 114. Otherwise, domestic water in water storage tank 54 is heated in the same manner.

Indirect water heating system 120 shown in FIG. 13 also operates in a manner similar to that of indirect heating system 50. However, instead of utilizing a combustible fuel burner to heat the recirculating water or fluid, solar heater 122 continuously heats the recirculating fluid. Accordingly, recirculating fluid enters solar heater 122 via inlet port 124 from pipe section 76. Heated recirculating fluid then exits solar heater 122 through outlet port 126 and travels through pipe section 74 to water storage tank 54. Again, the heating of domestic water within water storage tank 54 is conducted in the same manner as described above with reference to indirect water heating systems 10 and 50.

In each of the embodiments, a pump is optionally provided to force circulation of fluid between the water heater and water storage tank. Such a pump may promote circulation when convection currents are not sufficient. However, referring to FIG. 1, it is anticipated that recirculating water will rise within water heater 15 and travel through pipe section 36 to water storage tank 14. The heated recirculating fluid will then flow downwardly through coiled heat exchange tube 32 as it cools via heat transfer to the domestic water. The cooler recirculating water then flows back to water heater 15 through pipe section 38. The nature of the recirculating water flow will promote circulation without a pump. However, a pump may be provided to encourage this flow or promote such flow in the other embodiments.

It is also contemplated that a valve (not shown) is optionally provided along the pipe section near the inlet to the water storage tank as well as temperature sensors for measuring the temperature of recirculating fluid and the temperature of the domestic water in the water storage tank. The temperature sensors are connected to the valve through a controller. The controller is calibrated to prevent fluid circulation when the recirculating fluid temperature falls below that of the domestic water in the water storage tank. Accordingly, if for any reason the heat source for the water heater is not operating, fluid will not continue to recirculate and act to cool the domestic water.

In any embodiment, the indirect water heating system according to this invention confers many significant benefits. First, the indirect water heating system provides an economical and durable appliance for use in both residential and commercial applications. The indirect water heating system can be provided with standard glass-lined water storage tanks without compromising the storage tank longevity.

The heat transfer function of the water heating system is made possible by using a heat exchange tube having a double-wall construction. The outer wall of the coiled heat exchange tube when mounted in a dielectric fitting provides dielectric isolation, thereby preventing the accelerated corrosion associated with the exposure of dissimilar metals to water within water storage tanks. The non-metallic outer wall prevents oxygen permeation to the metallic inner wall and avoids direct corrosion of the inner wall. The inner wall is formed from a soft metallic material which provides strength and structure to the coiled heat exchange tube while providing increased conductivity for improved heat exchange and malleability to facilitate coil formation.

The indirect water heating system confers these benefits in any embodiment, and various modifications to the overall system or its various components can be made without reaching beyond the scope of this invention. For example, the water storage tank inlet and outlet ports at which the coiled heat exchange tube terminates can be formed in the wall, the top, through the bottom, or in any combination of the water storage tank surfaces. Fluid may enter the coiled heat exchange tube near the bottom of the water storage tank instead of near the top. The indirect water heating system can utilize any known type of water heater, including combustible fuel burners such as direct-fired gas or oil burners and furnaces, electric water heaters, wood burning heaters, etc.

The double-wall heat exchange tube is preferably formed with a nonmetallic coating such as high density polyethylene, but can be formed from many other materials, including but not limited to polyethylene and polypropylene. The inner wall is preferably formed from a malleable metallic material such as aluminum or copper, but may optionally be formed from any other suitable material, including but not limited to carbon and stainless steel. The outer wall may optionally be co-extruded over the inner wall so as to maintain a uniform fit between the heat exchange tube's outer and inner walls. The outer wall may optionally be applied by employing materials such as heat shrink tubing. The outer wall may also be applied by means of a heat fit process wherein the outer wall is heated to cause its expansion, and the inner wall is placed within the outer wall so that when the outer wall cools and contracts there remains a close fit between the inner and outer walls.

No matter how the outer wall is applied to the inner wall, it is preferable that a path remains between the walls to permit the drainage of trapped liquid. To ensure that such a path remains between the walls, one or more monofilaments, strips or wires may optionally be inserted in an axial, spiral or some other orientation between the walls. Such monofilaments provide an improved leak path while maintaining continuous contact between the inner surface of said non-metallic outer tube and the outer surface of said metallic inner tube the tubing inner and outer walls. Such contact is important to maintain adequate heat transfer characteristics.

The indirect water heating system also optionally includes one or more stabilizer brackets to keep the heat exchange tube centered in the tank. Such brackets help locate the tubing ends during manufacturing and prevent tubing damage when the tank is rolled. Also, the tanks used in the indirect water heating system optionally include many standard components, including an outer jacket, a dip tube, a sacrificial anode and other components.

The dimensions of the coiled heat exchange tube may vary depending on practical considerations. For example, an increase in the diameter of the coiled heat exchange tube will increase the surface area over which heat exchange may occur. Similarly, the wall thickness of the inner and outer walls can be increased or decreased to facilitate the co-extrusion and coiling processes, and when a nonmetallic, nonconductive material is used to form the outer wall, the thickness of the outer wall may be reduced to decrease its insulative effect. The thickness of the inner wall must be sufficient to avoid kinking of the heat exchange tube during the coiling process and must be suitable to maintain the shape of a finally coiled heat exchange tube.

The dielectric fitting assembly may be structured in any way capable of maintaining dielectric isolation between the metallic inner wall of the heat exchange tube and the inside surface of the steel fitting, and the heat exchange tube can be mounted within the dielectric fitting assembly in any way which prevents substantial axial movement of the heat exchange tube within the dielectric fitting assembly. A plastic fitting may optionally be used to provide dielectric isolation between the metallic inner wall of the heat exchange tube and the inlet and outlet ports of the water storage tank.

The recirculating fluid circulates through the recirculating fluid conduit assisted by convection currents and other natural phenomenon. However, it is also contemplated that a pump and valve system may also be used to assure proper fluid circulation and flow rate.

These and other modifications to the indirect water heating system can be made without exceeding the scope and spirit of this invention. The scope of this invention is separately defined in the following claims.

What is claimed is:

1. Corrosion-resisting apparatus for indirectly heating a domestic water supply comprising a combination of a heater for heating aqueous recirculating fluid, and a water storage tank, said heater being spaced apart and remote from said storage tank and connected to convey heat from said recirculating aqueous fluid supply to said water supply, while preventing mixing and ionic exchange between said aqueous recirculating fluid and said water supply, said apparatus comprising:

a glass-lined storage tank for containing said water supply, said storage tank having a water inlet port, a water outlet port, and a heat-exchanging tube in said storage tank;

a heating tube connected to convey said hot water to said heat-exchanging tube, said heat-exchanging tube having a plural wall comprising (a) a non-metallic outer wall and (b) a metallic inner wall, whereby said water supply is exposed only to said glass lining and to said non-metallic outer wall and is accordingly free of exposure to dissimilar metals and not subjected to any substantial ionic corrosion in said storage tank, wherein the inner surface of said non-metallic outer wall is in continuous contact with the outer surface of said metallic inner wall, a portion of one of said walls being removed between said walls to provide an elongated passageway extending between said walls, and said passageway having an exit opening leading away from said plural-wall tube, and wherein said passageway contains an elongated non-metallic material extending along between said non-metallic outer wall and said metallic inner wall and maintains substantially continuous heat transfer contact therebetween, said plural wall being sealed to prevent mixing of said water supply and said aqueous recirculating fluid, wherein said passageway is arranged lengthwise along said plural-wall heat-exchanging tube between said outer and inner walls, whereby any fluid that may leak through either wall can exit along said passageway and out of said storage tank, and wherein said plural-wall heat-exchanging tube is not metallurgically bonded.

2. The combination defined in claim 1, wherein said metallic inner wall is formed from a material selected from the group consisting of aluminum, copper, stainless steel, and carbon steel.

3. The combination defined in claim 1, wherein said non-metallic outer wall is formed from a material selected from the group consisting of polyethylene, polypropylene, and high density polyethylene.

4. The combination defined in claim 1, wherein said heat-exchanging tube terminates at a wall of said storage tank.

5. The combination defined in claim 1, wherein said heat-exchanging tube terminates in a top of said storage tank.

6. The combination defined in claim 1, wherein said elongated material extending along between said non-metallic outer wall and said metallic inner wall is in continuous contact with both of said walls.

7. The combination defined in claim 6, wherein said elongated member is a nylon monofilament.

8. The combination defined in claim 1, wherein said heat-exchanging tube comprises a plurality of coils, and wherein said apparatus further comprises a support member contacting said coils of said heat-exchanging tube and attached to said coils to reduce relative movement of said coils.

9. The combination defined in claim 8, wherein said support member is a coil spacing bracket shaped for snap-on attachment to said coils.

10. The combination defined in claim 1, wherein said recirculating fluid heater is a solar heater used in heating a domestic water supply.

11. The combination defined in claim 1, wherein said recirculating fluid heater is a combustible fuel burner.

12. The combination defined in claim 11, wherein said combustible fuel burner is a direct-fired gas burner.

13. The combination defined in claim 11, wherein said combustible fuel burner is a direct-fired oil burner.

14. The combination defined in claim 1, wherein said recirculating fluid heater is an electric water heater.

* * * * *